(12) United States Patent
Midorikawa

(10) Patent No.: US 7,836,995 B2
(45) Date of Patent: Nov. 23, 2010

(54) FAILURE DIAGNOSIS METHOD OF SEAT BELT SYSTEM AND SEAT BELT SYSTEM HAVING FAILURE DIAGNOSIS FUNCTION

(75) Inventor: Yukinori Midorikawa, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 512 days.

(21) Appl. No.: 11/666,062

(22) PCT Filed: Oct. 21, 2005

(86) PCT No.: PCT/JP2005/019834

§ 371 (c)(1),
(2), (4) Date: Dec. 3, 2007

(87) PCT Pub. No.: WO2006/043724

PCT Pub. Date: Apr. 27, 2006

(65) Prior Publication Data

US 2008/0191458 A1    Aug. 14, 2008

(30) Foreign Application Priority Data

Oct. 21, 2004  (JP) ............................. 2004-307509

(51) Int. Cl.
    *B60R 21/00*    (2006.01)
(52) U.S. Cl. ......................................... 180/268; 701/45
(58) Field of Classification Search ................. 180/268, 180/270, 281; 280/807; 701/45
    See application file for complete search history.

(56) References Cited

U.S. PATENT DOCUMENTS

| 6,257,363 | B1 * | 7/2001 | Midorikawa et al. ........ 180/268 |
| 6,485,057 | B1 * | 11/2002 | Midorikawa et al. ........ 280/807 |
| 6,561,299 | B2 * | 5/2003 | Midorikawa et al. ........ 180/268 |
| 6,669,234 | B2 * | 12/2003 | Kohlndorfer et al. ..... 280/801.1 |
| 6,729,650 | B2 * | 5/2004 | Midorikawa et al. ........ 280/807 |
| 6,843,339 | B2 * | 1/2005 | Midorikawa et al. ........ 180/268 |

(Continued)

FOREIGN PATENT DOCUMENTS

GB      2 335 890 A    10/1999

(Continued)

*Primary Examiner*—Paul N Dickson
*Assistant Examiner*—Drew Brown
(74) *Attorney, Agent, or Firm*—Brinks Hofer Gilson & Lione

(57) ABSTRACT

A seat belt apparatus is provided which includes a retractor having an electric motor to retract or draw out a seat belt, a motor information detecting means to detect an amount of rotation and a current value of the electric motor, a first condition detecting means to detect that an ignition switch is in an OFF state, a second condition detecting to detect that a getting on/off door located nearest to a seat to which a seat belt is attached is opened, a failure diagnosis timing judging means to start a failure diagnosing operation when a detecting signal is output from both the condition detecting means, and a failure diagnosing means to apply a driving current to the electric motor when the failure diagnosing operation is stated and to carry out a failure diagnosis of a driving system including a electric motor based on an output, in response to the application of a current, from the motor information detecting means. By configuring as above, the failure diagnosis can be carried out without causing a feeling of abnormality of discomfort to a vehicle occupant.

12 Claims, 9 Drawing Sheets

U.S. PATENT DOCUMENTS

| | | |
|---|---|---|
| 6,976,708 B2 * | 12/2005 | Aoki et al. .................. 280/807 |
| 6,997,277 B2 * | 2/2006 | Midorikawa et al. ........ 180/268 |
| 7,419,026 B2 * | 9/2008 | Midorikawa ................ 180/268 |
| 2001/0025735 A1 | 10/2001 | Yukinori |
| 2003/0075914 A1 * | 4/2003 | Kohlndorfer et al. ........ 280/808 |
| 2003/0173131 A1 * | 9/2003 | Midorikawa et al. ........ 180/268 |
| 2004/0104570 A1 * | 6/2004 | Midorikawa et al. ........ 280/807 |
| 2005/0017494 A1 * | 1/2005 | Midorikawa ............. 280/801.1 |
| 2008/0211442 A1 * | 9/2008 | Odate ......................... 318/449 |
| 2008/0265551 A1 * | 10/2008 | Odate ......................... 280/733 |

FOREIGN PATENT DOCUMENTS

| | | |
|---|---|---|
| JP | 11-170966 | 6/1999 |
| JP | 202 052927 A | 2/2000 |
| JP | 2000-52927 A | 2/2000 |

* cited by examiner

FAILURE DIAGNOSIS METHOD OF SEAT BELT SYSTEM AND SEAT BELT SYSTEM HAVING FAILURE DIAGNOSIS FUNCTION

CROSS REFERENCE TO RELATED APPLICATIONS

This application claims priority to Japanese patent application number 2004-307509, filed Oct. 21, 2004 and PCT/JP2005/019834, filed Oct. 21, 2005.

FIELD OF THE INVENTION

The present invention relates to a failure diagnosing method for a vehicle seat belt apparatus having a retractor to provide a retracting power to a seat belt by using an electric motor and to the vehicle seat belt apparatus having a failure diagnosing function to perform the above diagnosing method.

BACKGROUND OF THE INVENTION

A conventional seat belt apparatus is known which is configured to have a belt retractor including an electric motor to make a spool be driven and rotated so that a seat belt is retracted and drawn out. When a seat belt is retracted and drawn out by the retractor having an electric motor, a failure in the electric motor makes it impossible for the seat belt apparatus to deliver its intended function. Technology for diagnosing such a failure is disclosed in Japanese Patent application Laid-open No. Hei 11-170966.

According to this disclosed conventional technology, a voltage having specified waveforms is applied to an electric motor and waveforms of the current through the motor are used for diagnosing.

In the technology disclosed in the patent reference, the seat belt apparatus is so configured that a seat belt does not cause a feeling of abnormality or discomfort to a vehicle occupant by lowering the voltage to be applied to the electric motor as much as possible or by shortening the time during which the voltage is applied. However, when the above failure diagnosing operation is actually performed while the vehicle occupant is fastening the seat belt, there is a possibility that the vehicle occupant will have a feeling of abnormality or discomfort. Furthermore, if this failure diagnosis is carried out at bad timing despite actual necessity of driving of the electric motor (that is, when an retracting operation or drawing operation is required), there is a possibility that the desired operation of the motor are adversely affected. In other words, there is a possibility that not only a vehicle occupant fastening a seat belt has a feeling of abnormality or discomfort but also an operation of the seat belt apparatus itself is adversely affected.

Thus, in view of the above, it is an object of the present invention to provide a failure diagnosing method for a vehicle seat belt apparatus which is capable of carrying out a failure diagnosis without causing a feeling of abnormality or discomfort to a vehicle occupant or adversely affecting an original operation of a seat belt and a vehicle seat belt apparatus having a failure diagnosing function to carry out the diagnosis.

SUMMARY OF THE INVENTION

A failure diagnosing method of a seat belt apparatus of the present invention is characterized by having a retractor to provide retracting power to a seat belt by driving to rotate a retractor spool in an electric motor, the method including:

a step of applying a driving current to the electric motor in a state in which an ignition switch of a vehicle is OFF and during a time period when a vehicle door located nearest to a seat to which a seat belt is attached is changed from its closing state to its opening state;

a step of collecting information about operation of the electric motor in response to the application of the driving current to the motor; and a step of carrying out failure diagnosis of a driving system including the electric motor based on the information.

Another embodiment of a failure diagnosing method of the seat belt apparatus of the present invention is characterized in that a driving current is applied to the electric motor within the time period so that the spool rotates in a direction of drawing out a seat belt and, if an amount of rotation of the electric motor or the spool obtained after a lapse of specified time is in a proper range, a result from the failure diagnosis is judged as normal and, otherwise, a result from the diagnosis is judged as abnormal.

Another embodiment of a failure diagnosing method of the seat belt apparatus of the present invention is characterized in that a driving current is applied to the electric motor within a time period so that the spool rotates in a direction of drawing out a seat belt and, if an amount of rotation of the electric motor or the spool obtained after a lapse of specified time is in a proper range, the driving current is further continuously applied to the electric motor within a time period so that the spool rotates in a direction of retracting a seat belt and, if the electric motor or the spool stops its rotation within a specified time, a result from the diagnosis is judged as normal and, otherwise, a result from the diagnosis is judged as abnormal.

Another embodiment of a failure diagnosing method of a seat belt apparatus of the present invention is characterized in that a driving current is applied to the electric motor within a time period so that the spool rotates in a direction of retracting a seat belt and, if a current flowing through the electric motor reaches a specified value or more within a predetermined time, a result from the diagnosis is judged as normal and, otherwise, a result from the diagnosis is judged as abnormal.

Another embodiment of a failure diagnosing method of a seat belt apparatus of the present invention is characterized in that a driving current is applied to the electric motor within a time period so that the spool rotates in a direction of drawing out a seat belt and, if a current flowing through the electric motor is in a proper range after a predetermined time, a result from the diagnosis is judged as normal and, otherwise, a result from the diagnosis is judged as abnormal.

Another embodiment of a failure diagnosing method of a seat belt apparatus of the present invention is characterized in that a driving current is applied to the electric motor so that the spool rotates in a direction of drawing out a seat belt and, if a current flowing through the electric motor is in a proper range after a predetermined time, the driving current is further continuously applied to the electric motor so that the spool rotates in a direction of retracting a seat belt and, if a current flowing through the electric motor reaches a specified value or more within a predetermined time, a result from the diagnosis is judged as normal and, otherwise, a result from the diagnosis is judged as abnormal.

A seat belt apparatus of the present invention is characterized by having failure diagnosing functions including:

a retractor with an electric motor to drive to rotate a reel for providing power of retracting to a seat belt;

a motor information detecting unit to detect information related to operations of the electric motor;

an ignition detecting unit to detect an ON/OFF state of an ignition switch of a vehicle;

an opening/closing detecting means to detect an opening or closing state of a vehicle entrance located nearest to a seat to which the seat belt is attached;

a first condition detecting unit to detect that the ignition switch is in an OFF state according to a signal from the ignition detecting unit;

a second condition detecting unit to detect that the vehicle door is changed from its closing state to its opening state according to a signal from the opening/closing detecting means;

a failure diagnosis timing judging unit to start a failure diagnosis operation when a detecting signal is output from both the first condition detecting unit and the second condition detecting unit; and a failure diagnosing unit to apply a driving current to the electric motor when a failure diagnosing operation is started based on a judgment of the failure diagnosis timing judging unit and to perform a failure diagnosis of a driving system including the electric motor based on an output, in response to the application of the current, from the motor information detecting unit.

Another embodiment of a seat belt apparatus of the present invention is characterized in that the motor information detecting unit has a function of detecting rotation of the electric motor or of the spool and wherein the failure diagnosing unit applies, when an failure diagnosis operation is started based on a judgment of the failure diagnosis timing judging unit, a driving current so that a spool rotates in a direction of drawing out a seat belt and, if an amount of rotation of the electric motor or the spool detected by the motor information detecting unit is in a proper range after a lapse of a predetermined time period, judges a result from the failure diagnosis as normal and judges, otherwise, a result from the failure diagnosis as abnormal.

Another embodiment of a seat belt apparatus of the present invention is characterized in that the motor information detecting unit has a function of detecting rotation of the electric motor or the spool and wherein the failure diagnosing unit applies, when a failure diagnosis operation is started based on a judgment of the failure diagnosis timing judging unit, a driving current to the electric motor so that the spool rotates in a direction of drawing out a seat belt and, if an amount of rotation of the electric motor or the spool detected by the motor information detecting unit is in a proper range after a lapse of predetermined time, further continuously applies a driving current to the electric motor so that the spool rotates in a direction of retracting a seat belt and, if the motor information detecting unit detects stop of rotation of the electric motor or the spool within a predetermined time, judges a result from the diagnosis as normal and judges and, otherwise, a result from the diagnosis as abnormal.

Another embodiment of a seat belt apparatus of the present invention is characterized in that the motor information detecting unit has a function of detecting magnitude of a current flowing through the electric motor and wherein the failure diagnosing unit applies, when a failure diagnosis operation is started based on a judgment of the failure diagnosis timing judging unit, a driving current to the electric motor so that the spool rotates in a direction of retracting a seat belt and, if magnitude of a current of the electric motor to be detected by the motor information detecting unit reaches a specified value or more within a predetermined time, judges a result from the diagnosis as normal and judges, otherwise, a result from the diagnosis as abnormal.

Another embodiment of a seat belt apparatus of the present invention is characterized in that the motor information detecting unit has a function of detecting magnitude of a current flowing through the electric motor and wherein the failure diagnosing unit applies, when a failure diagnosis operation is started based on a judgment of the failure diagnosis timing judging unit, a driving current to the electric motor so that the spool rotates in a direction of retracting a seat belt and, if magnitude of a current of the electric motor to be detected by the motor information detecting unit is in a proper range after a predetermined time, judges a result from the diagnosis as normal and judges, in cases other than that, a result from the diagnosis as abnormal.

Another embodiment of a seat belt apparatus of the present invention is characterized in that the motor information detecting unit has a function of detecting magnitude of a current flowing through the electric motor and wherein the failure diagnosing unit applies, when a failure diagnosis operation is started based on a judgment of the failure diagnosis timing judging unit, a driving current to the electric motor so that the spool rotates in a direction of retracting a seat belt and, if magnitude of a current of the electric motor to be detected by the motor information detecting unit is in a proper range after a predetermined time, further continuously applies a driving current to the electric motor so that the spool rotates in a direction of retracting a seat belt and, if magnitude of a current of the electric motor to be detected by the motor information detecting unit, judges a result from the diagnosis as normal and judges and, otherwise, the result from the diagnosis as abnormal.

According to the configurations of the present invention, the failure diagnosis is carried out while an ignition switch is in an OFF state and at a time when the vehicle door located nearest to a seat to which a seat belt is attached is changed from its closing state to its opening state, that is, not while the vehicle occupant fastens the seat belt but at a time when the vehicle occupant gets off from a vehicle or gets in the vehicle (at this time, the vehicle occupant takes out the seat belt at all times) and, as a result, there is no possibility of causing a feeling of abnormality or discomfort to the vehicle occupant. Moreover, the failure diagnosis is not carried out while the vehicle occupant fastens the seat belt and, therefore, even if the failure diagnosis is carried out at bad timing when the driving of the electric motor is required, its original operation is not affected adversely at all. Moreover, a result of the automatic failure diagnosis can be obtained, for example, when a vehicle occupant gets into a vehicle next time.

In one embodiment of the invention, whether the seat belt apparatus is normal or abnormal is judged by forcedly making the retractor perform an operation of drawing out a seat belt to check if the rate of rotation of the electric motor (or the spool) per hour (or other time period) is proper or not (that is, if the motor or spool rotates properly).

In one embodiment of the invention, the retractor is forcedly made to draw a seat belt and whether the rate of rotation of the electric motor (or the spool) per hour at this time point is proper or not is checked first and, if the amount of the rotation is proper, further continuously, the retractor is made to perform an operation of retracting the seat belt. The electric motor must be locked (that is, its rotation is stopped) when the seat belt is retracted up to its end and, therefore, when locking is confirmed after a lapse of appropriate time, the seat belt apparatus is judged as normal and, in cases other than that, since there is a possibility that the electric motor is not operating properly, the seat belt is judged as abnormal.

In one embodiment of the invention, the retractor is forcedly made to perform the operation of retracting a seat belt. The retraction of a seat belt up to its end causes the electric motor to be locked (that is, the rotation is stopped) and a value of a current flowing through the electric motor due to an increase in load must be increased and, therefore, when locking of the motor is confirmed by a rise in the current value within a proper time after retraction of the seat belt is started, the seat belt apparatus is judged as normal. In cases other than that, there is a possibility that the electric motor is not operating properly and the seat belt apparatus is judged as abnormal accordingly.

In one embodiment of the invention, the retractor is forcedly made to perform an operation of retracting a seat belt and, if a current flowing through the motor at this time point is proper, the electric motor is considered to be rotating properly and the seat belt apparatus is judged as normal. Otherwise, there is a possibility that the motor is not operating properly and, therefore, the seat belt apparatus is judged as abnormal.

In one embodiment of the invention, the retractor is forcedly made to perform an operation of drawing a seat belt and, if an amount of a current flowing through the motor at this time point is proper, further continuously, the retractor is forcedly made to perform an operation of retracting the sea belt. The retraction of the seat belt up to its end causes the motor to be locked (that is, the rotation is stopped) and a value of a current flowing through the motor due to an increase in load must be increased and, therefore, when locking of the electric motor is confirmed by a rise in the current value within a proper time after retraction of a seat belt is started, the seat belt apparatus is judged as normal. Otherwise, there is a possibility that the motor does is not operating properly and the seat belt apparatus is judged as abnormal accordingly.

Thus, by performing the failure diagnosing operations as above, it is made possible to achieve easy failure diagnosis of a driving system including the electric motor.

DETAILED DESCRIPTION OF THE INVENTION

Hereinafter, embodiments of the present invention are described in detail by referring to drawings.

Figure 1:
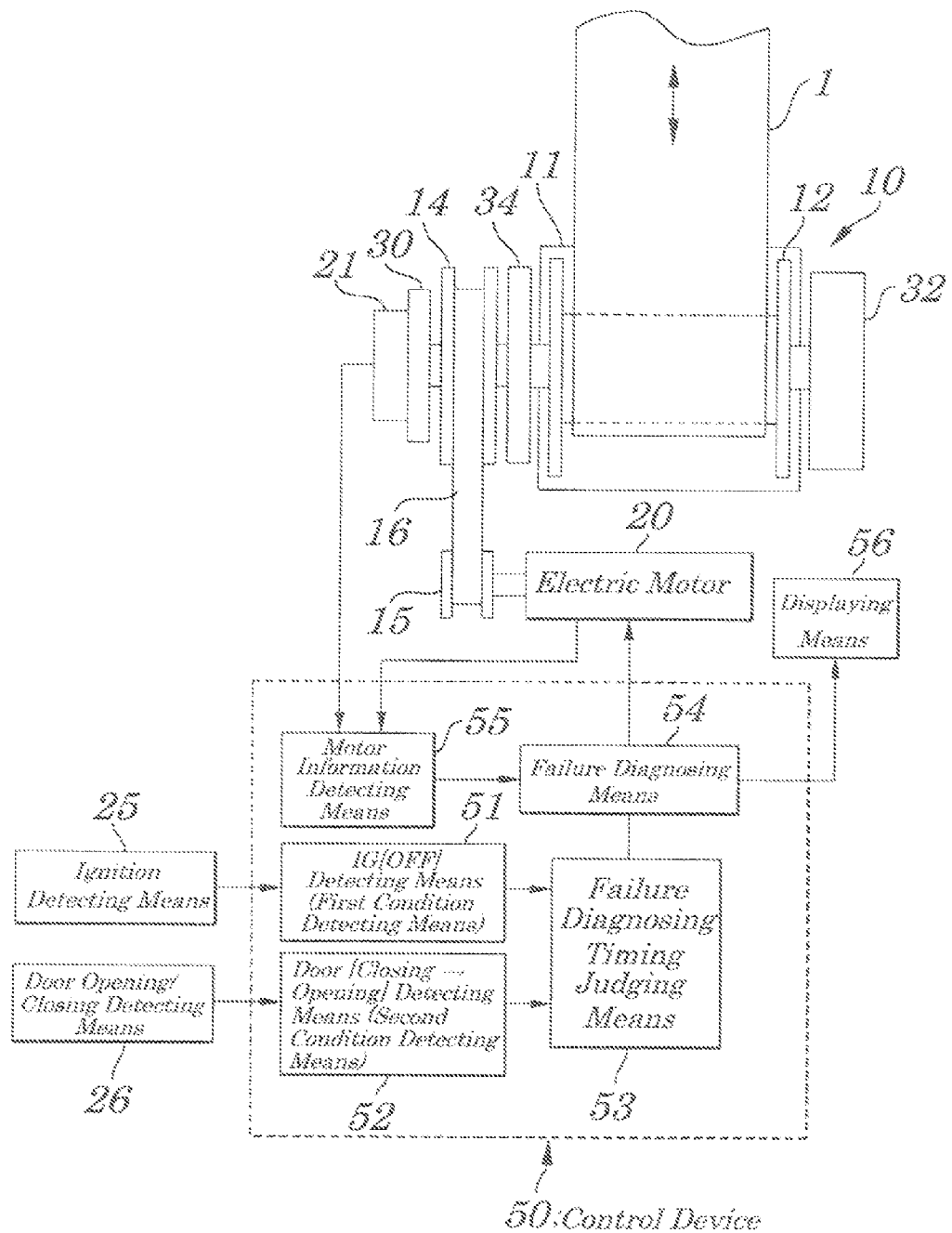
FIG. 1 is a block diagram schematically showing configuration of a failure diagnosing apparatus of a seat belt apparatus according to the embodiment of the present invention.
Figure 2:
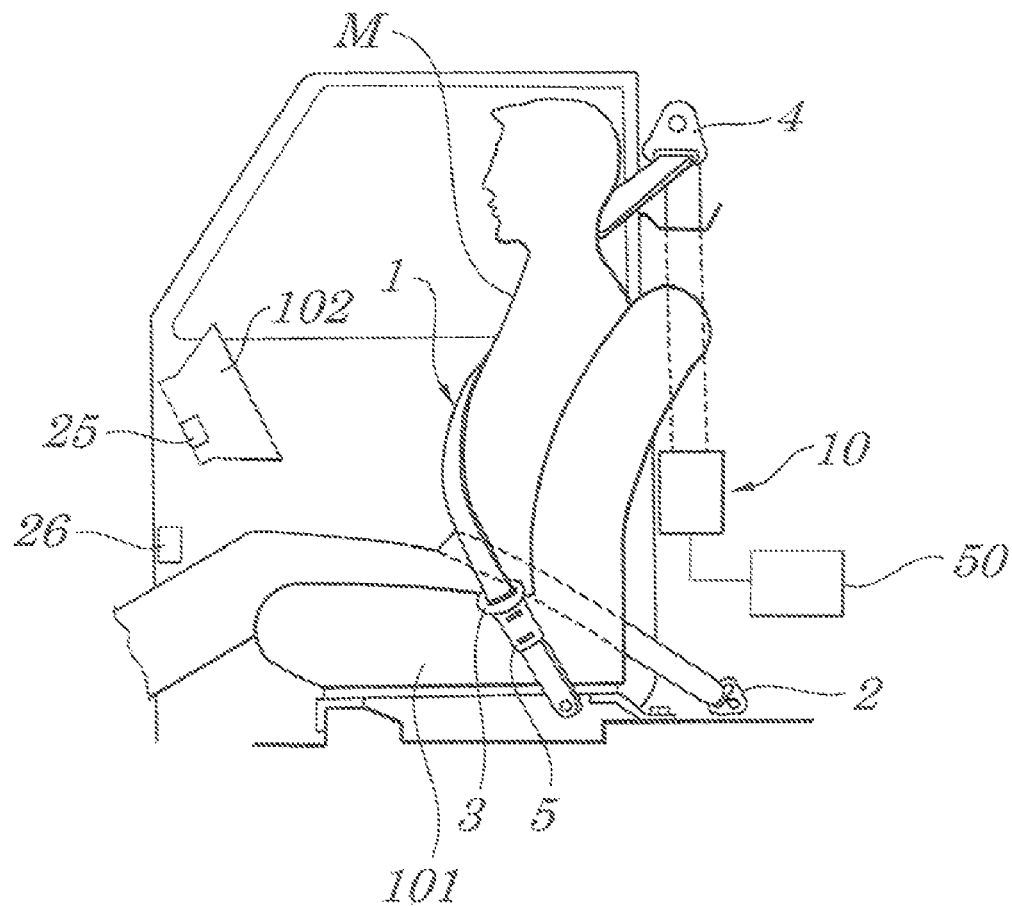
FIG. 2 is a diagram explaining the seat belt apparatus according to the embodiment of the present invention.
Figure 3:
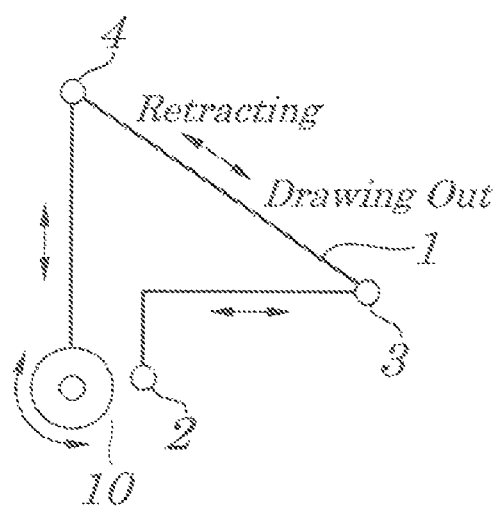
FIG. 3 is a diagram schematically explaining a routing path of the seat belt according to the embodiment of the present invention.

FIG. 1 is a diagram schematically showing configurations of main portions of a seat belt apparatus having a failure diagnosing function according to the embodiment. FIG. 2 is a diagram schematically showing entire configurations of the seat belt apparatus of an embodiment. FIG. 3 is a diagram schematically showing a routing path of the seat belt according to the embodiment.

The seat belt apparatus, as shown in FIG. 2, includes a lap and diagonal seat belt (webbing) 1 to restrain a vehicle occupant M on a seat 101, a retractor to retract or draw out the seat belt 1, a control device 50 to control an entire seat belt apparatus. The seat belt apparatus, as shown in FIG. 1, includes, as elements making up a failure diagnosing system, an ignition detecting means 25 to detect whether an ignition switch of a vehicle is turned ON or OFF, a door opening/closing detecting means 26 to detect opening and closing of a vehicle entrance door located nearest to a seat to which a seat belt is attached, a displaying means 56 to display the presence or absence of a failure, or a like. As means to achieve above functions, an ignition switch, a door switch, a display device, or a like, all being originally attached to a vehicle, can be used in a shared manner.

The seat belt 1, as shown in FIGS. 2 and 3, is attached to a tongue plate 3, a shoulder anchor 4, and then a retractor 10, sequentially, using a floor anchor 2 as a starting point for attachment which is attached to a lower portion on one side of the seat 101. Thus, the seat belt apparatus is so configured that a vehicle occupant M can be restrained by connecting the tongue plate 3 to a buckle placed on a side portion of the seat 101. The retractor 10, as shown in FIG. 1, is so configured that a spool 12 around which the seat belt 1 is wound is installed so as to rotate freely and that, the seat belt 1 is retracted and drawn out by rotating the spool 12, and includes an electric motor 20 and retracting spring mechanism 30 to provide the spool 12 with a rotational power, an emergency locking mechanism 32 which operates at emergency time to lock rotation of spool 12 only in a direction in which the spool 12 draws the seat belt 1, a pretensioner 34 to provide tension for emergency to the seat belt 1 at time of the collision of a vehicle and to restrain the vehicle occupant on the seat 101, and a potentiometer 21 or other sensor to detect the rotation of the spool 12. The electric motor 20 may be directly connected to an axis of the spool 12, however, in the embodiment, the electric motor 20 is connected via the pulleys 14 and 15 to the axis of the spool 12.

Thus, the retractor 10 can automatically retract and draw out the seat belt 1 by driving the electric motor 20 attached thereto to rotate the spool 12 when necessary. The seat belt, after being taken out, can be retracted by using only power of the retracting spring mechanism 30, however, the seat belt 1 can be retracted more speedily by using power of the electric motor 20. Also, the seat belt 1, while being worn, can be easily drawn out by canceling tensile power of the retracting spring mechanism 30 by the power of the electric motor 20.

Also, upon anticipating the occurrence of a collision of a vehicle, an amount of momentary retraction of the pretensioner 34 can be decreased by starting the electric motor 20, prior to the collision, to retract a loosened portion of the seat belt 101, and the restraining performance of the pretensioner 34 can be enhanced if the collision should occur thereafter.

Also, the control device 50, in order to carry out diagnosis of a failure in a driving system including the electric motor 20, is configured to have a motor information detecting means 55 to detect information about operations of the electric motor 20, a first condition detecting means (IG [ON->OFF] detecting means) 51 to detect that the ignition switch is OFF according to a signal fed from the ignition detecting means 25, a second condition detecting means (door [closing->opening ]detecting means) 52 to detect that the vehicle entry door is changed from its closing state to its opening state according to a signal fed from the door opening/closing detecting means 26, a failure diagnosing timing judging means 53 to start a failure diagnosing operation when a detecting signal is output from both the first condition detecting means 51 and second condition detecting means 52, and a failure diagnosing means 54 to apply a driving current to the electric motor 20 when a failure diagnosing operation is started based on a judgment of the failure diagnosing timing judging means 53 and to carry out diagnosis of a driving system including the electric motor 20 based on an output, in response to the application of the current, from the motor information detecting means 55.

The motor information detecting means 55 has functions of calculating an amount of rotation of the spool 12 and/or the electric motor 20 using an output from the potentiometer 21 or detecting magnitude of a current flowing through the electric motor 20. Each of means included in the control device 50 may be configured by hardware or by software.

Next, processing to be performed by the control device is described. Moreover, the failure diagnosing method of each of the embodiments of the present invention is performed during each processing to be performed by each means.

Figure 4:
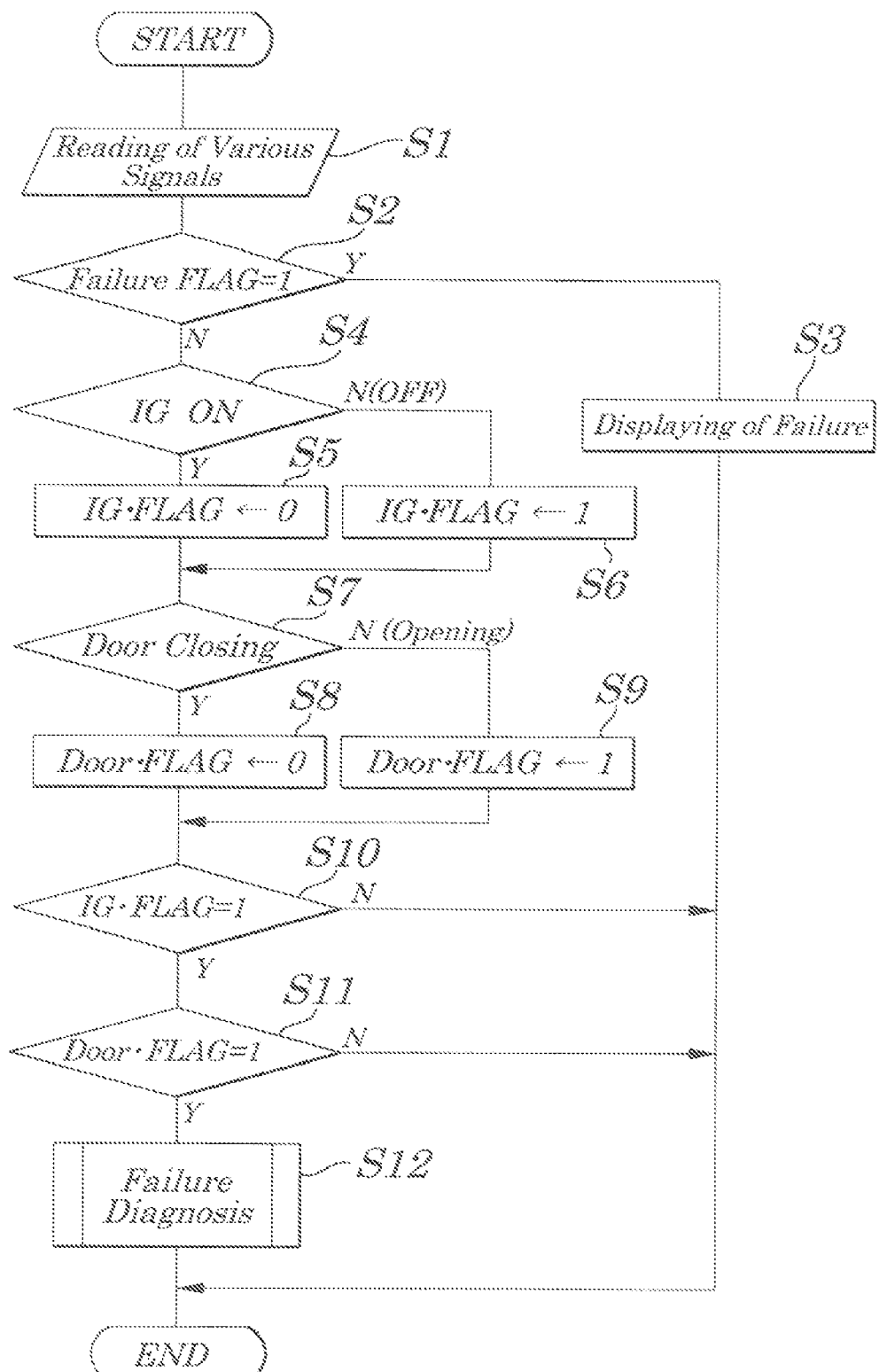
FIG. 4 is a flow chart showing a flow of a main routine out of processes to be performed according to the embodiment of the present invention.

FIG. 4 is a flow chart explaining a main routine to be executed by the control device 50.

The main routine is executed at an appropriate time interval when the ignition switch is turned ON or for some time after the ignition switch is turned OFF or when the door switch is changed from its closing state to its opening state after some time since the ignition switch is turned OFF and various signals are read at initial Step S1 after the starting of the routine. Next, whether or not a failure FLAG is set (to be 1) is checked at Step S2. When the failure FLAG has been set at a time of previous failure diagnosis, at this Step the judgment becomes "YES" and, therefore, at Step S3, the displaying means 56 is made to display an indication that there is a failure. From this result, a vehicle occupant can be aware that an abnormality occurs in the driving system (in the electric motor 20 in particular) of the seat belt apparatus. In that case, after taking the necessary measures, the failure FLAG may be simply reset.

At ordinary time, the failure FLAG is not set and, therefore, the routine proceeds from the Step S2 to Steps S4 to S6 to check the ON/OFF state of the ignition. Moreover, at Steps 7 to 9, a state of the door opening/closing switch is checked. So long as the ignition switch is in an ON state, the IG. FLAG is "0" (zero), however, when the ignition switch is in an OFF state, the IG. FLAG becomes "1". Similarly, so long as the door is in a closing state, the door FLAG is "0" (zero), however, when the door is changed from its closing state to its opening state, the door FLAG becomes "1". That is, the processes at Steps S4 to S6 are performed by the first condition detecting means (IG[OFF] detecting means) 51 described above and the processes at Steps S7 to S9 are performed by the second condition detecting means (door [closing to opening]detecting means) 52 described above.

At Steps 10 and 11, these IG.FLAG and door FLAG are monitored and, if both these FLAGs become "1", the routine proceeds to Step S12 to execute the sub-routine for the failure diagnosis. Therefore, the processes at the Steps S10 and S11 are performed by the failure diagnosing timing judging means 53 described above.

As described above, the failure diagnosis is carried out while an ignition switch is in an OFF state and at timing when the vehicle entrance door located nearest to a seat to which a seat belt is attached is changed from its closing state to its opening state, that is, not while the vehicle occupant fastens the seat belt but at timing when the vehicle occupant exits from a vehicle or enters the vehicle (at this timing, the vehicle occupant takes out the seat belt 1 at all times) and, as a result, there is no possibility of causing a feeling of abnormality or discomfort to the vehicle occupant M. Moreover, the failure diagnosis is not carried out while the vehicle occupant fastens the seat belt 1 and, therefore, driving for the operation by the electric motor 20 is not necessary and, even if the failure diagnosis is carried out at bad timing, operations of the failure diagnosis are not affected adversely at all.

Next, the failure diagnosing routine for each embodiment to be carried out while the ignition switch is in the OFF state and with timing when the getting on/off door located nearest to a seat to which the seat belt 1 is attached is changed from its closing state to its opening state is described below.

First Embodiment

Figure 5:
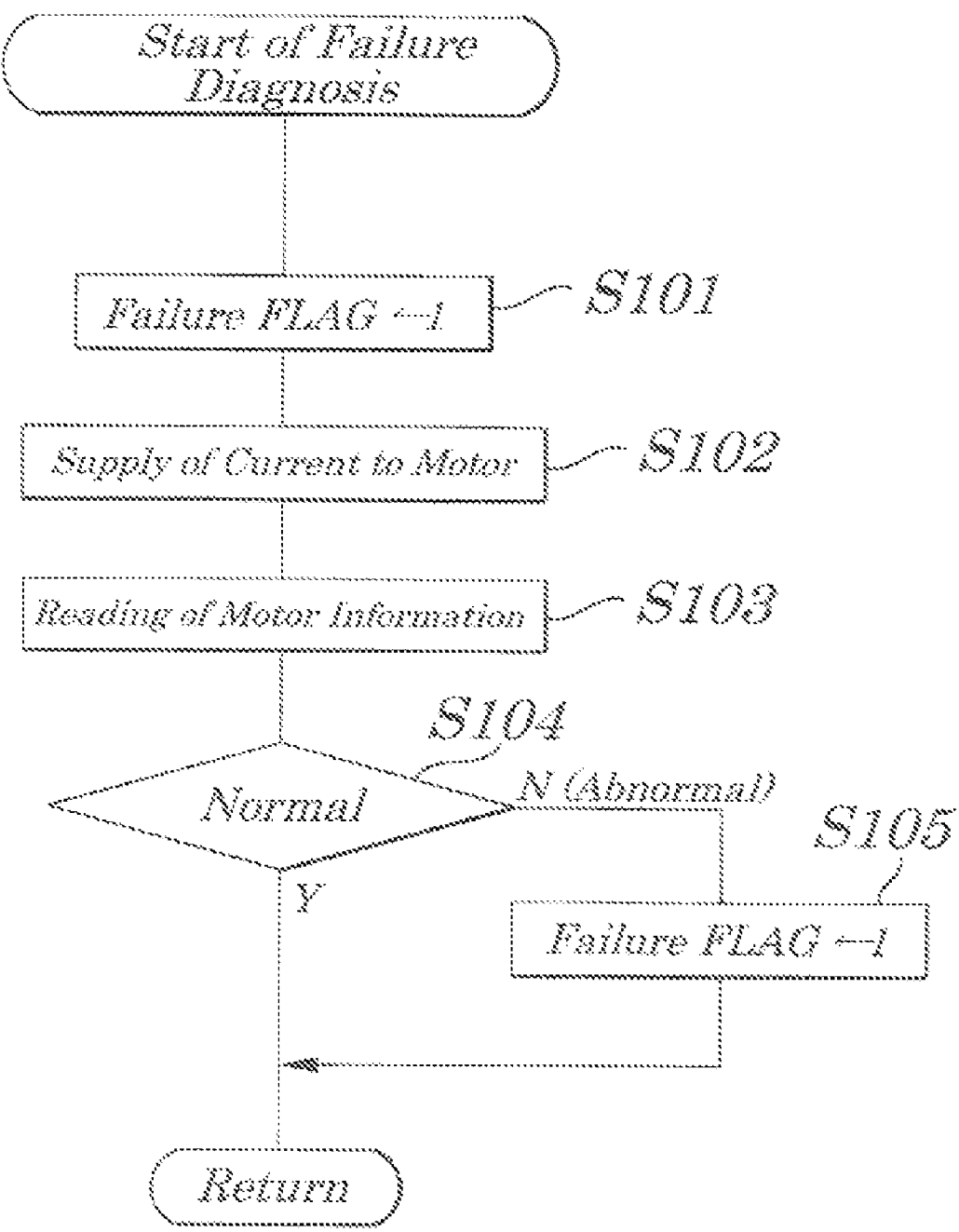
FIG. 5 is a flow chart showing contents of the failure diagnosis according to the first embodiment of the present invention.

FIG. 5 is a flow chart explaining the failure diagnosing routine of the first embodiment of the present invention.

When this diagnosing routine is started, the failure FLAG is reset at initial Step S101 and, at next Step S102, a specified amount of driving currents is applied to the electric motor 20 (at a level that causes the electric motor 20 to be rotated reliably) and information about operations of the electric motor 20 in response to the application of the currents is read. Then, at Step S104, a judgment is made as to whether the driving system including the electric motor 20 is normal or abnormal and, when there is abnormality, at Step S105, based on the read information, the failure FLAG is set and the program returns back to its main routine.

Second Embodiment

Figure 6:
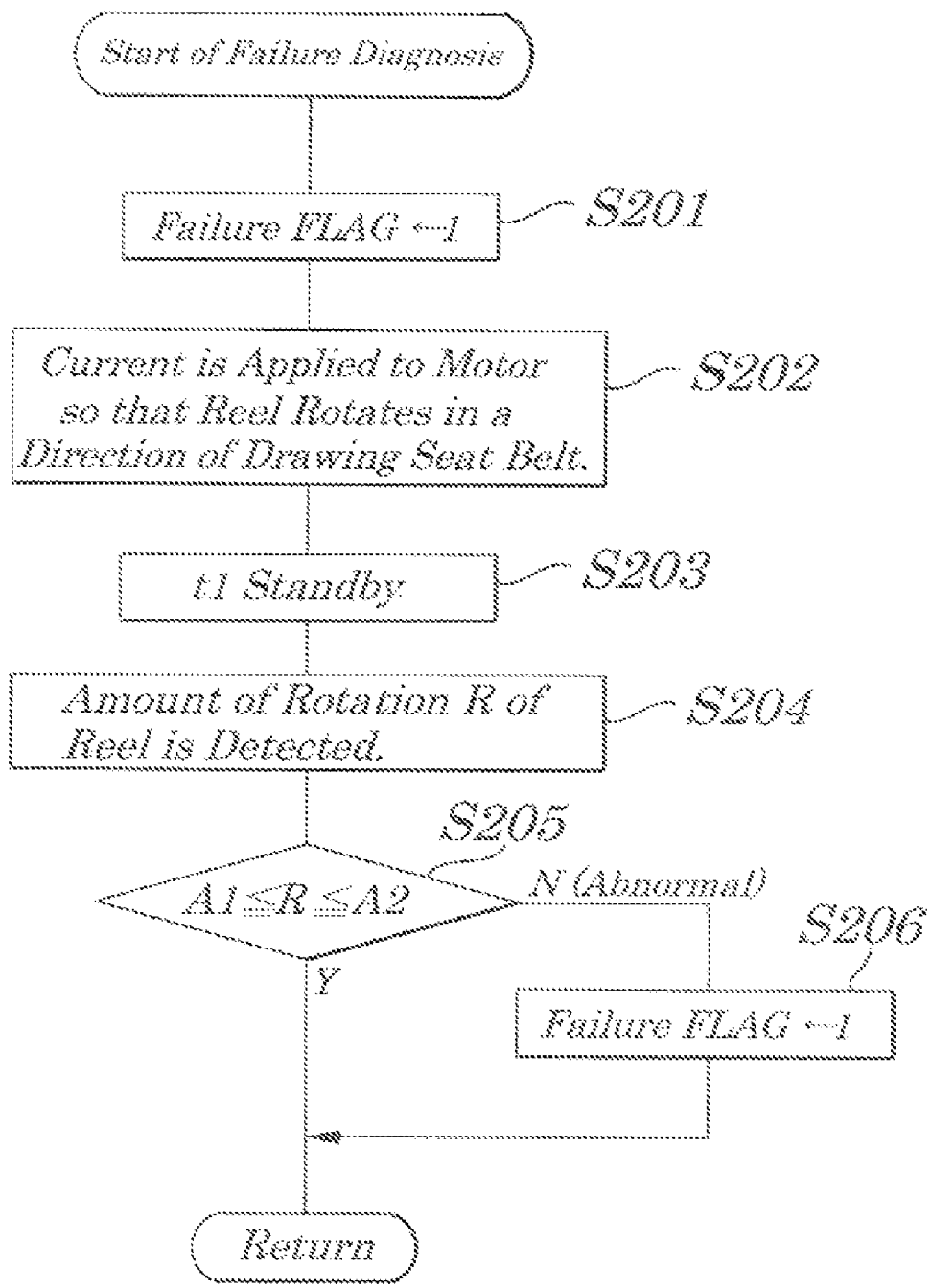
FIG. 6 is a flow chart showing contents of the failure diagnosis according to the second embodiment of the present invention.

FIG. 6 is a flow chart explaining a failure diagnosing routine of the second embodiment. In the embodiment, as a signal of the motor information detecting means 55, an amount of rotation R of the reel 12 (or the electric motor 20) is used.

When the failure diagnosing routine is started, at initial Step S201, a failure diagnosing FLAG is reset (to be 0) and at next Step S202, a specified amount of driving currents (at a level that causes the electric motor 20 to rotate reliably) is applied to the electric motor 201 so that the reel 12 rotates in a direction of drawing a seat belt. Then, at Step S203, the routine is on standby for a specified time "t1" and, thereafter, at Step S204, an amount of rotation R of the reel 21 is detected and, at Step S205, whether or not the amount of rotation R of the reel 21 is within an proper range is judged. That is, the judgment is made as to whether the amount of the rotation R is a preset specified amount A1 or more and a specified amount of A2 or less (A1$\leq$R$\leq$A2) and, if the amount of the rotation R is within a proper range, it is judged that a result from the diagnosis shows a normal state of the seat belt 1 and then related processing ends and, if otherwise, it is judged that the result from the diagnosis shows an abnormal state of the seat belt 1 and, at Step S206, the failure FLAG is set and then the related processing ends.

Thus, in the second embodiment, whether the seat belt apparatus is in a normal or abnormal state is determined by forcedly making the electric motor 20 of the retractor 10 perform an operation of drawing the seat belt 1 to see if an amount of rotation of the electric motor 20 (or the spool 21) per unit time is proper or not (that is, to see if the electric motor 20 is rotating properly or not). Therefore, by checking the rotation of the spool 21, exact failure diagnosis of the driving system including the electric motor 20 can be carried out easily.

Moreover, the time t1 can be set arbitrarily, however, if the time is too short, an amount of rotation enough to judge whether or not the failure occurs can not be obtained, in contrast, if the time is too long, the process of the judgment takes too much time. Therefore, the time t1 is allowed to be set simply so that the spool 21 rotates, for example, several times at a time of ordinary operation. Additionally, the values A1 and A2 are allowed to be set simply so that, whether or not the spool 21 rotated normally during a time period while the time t1 elapsed can be conformed.

Third Embodiment

Figure 7:
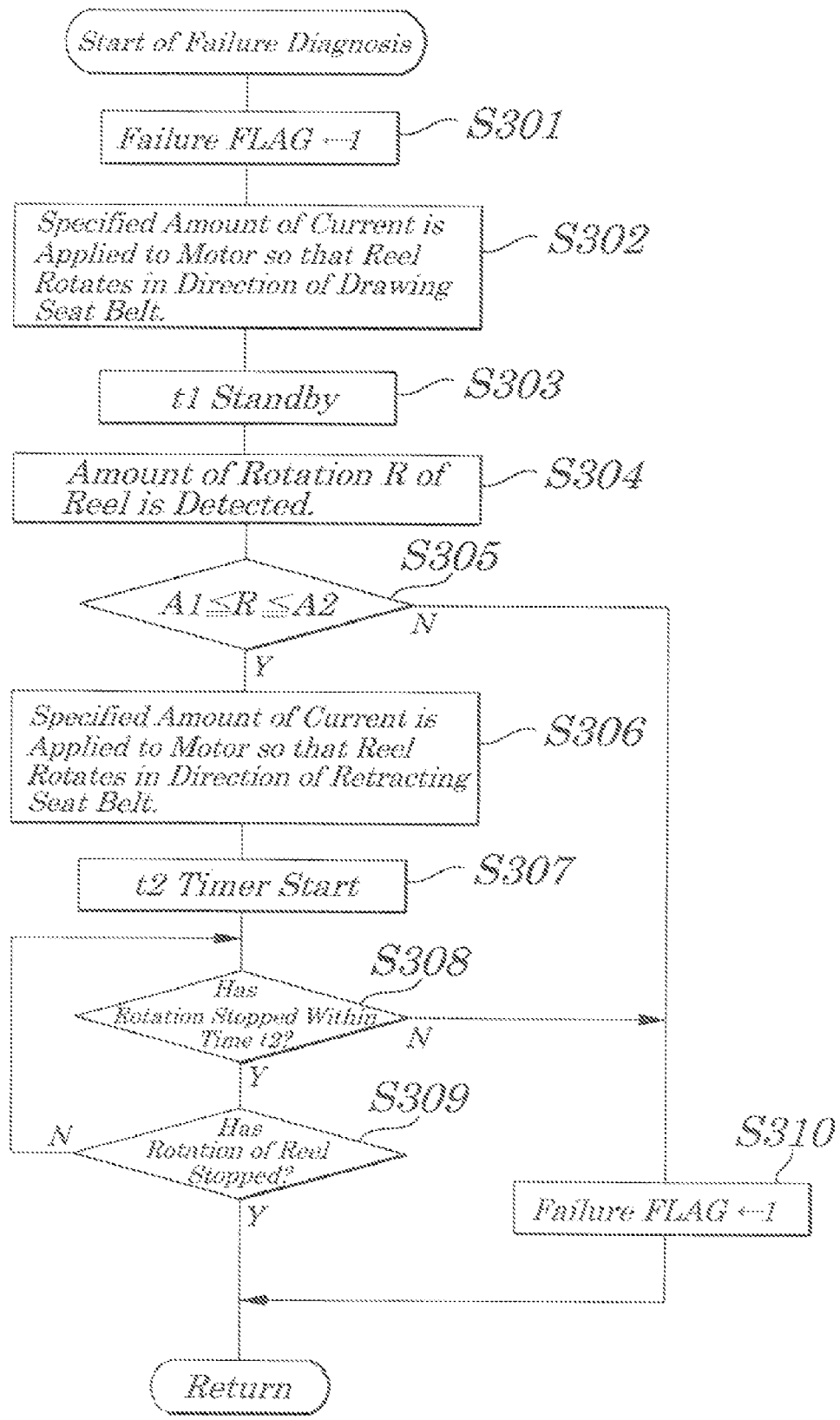
FIG. 7 is a flow chart showing contents of the failure diagnosis according to the third embodiment of the present invention.

FIG. 7 is a flow chart explaining a failure diagnosing routine of the third embodiment. In the embodiment, as a signal of the motor information detecting means 55, an amount of rotation R of the reel 12 (or the electric motor 20) is used.

When the failure diagnosing routine is started, at initial Step S301, the failure FLAG is reset (to be 0) and at next Step S302, a specified amount of driving currents (at a level that causes the electric motor 20 to rotate reliably) is applied to the electric motor 20 so that the reel 12 rotates in a direction of drawing (retracting) a seat belt. Then, at Step S303, the routine is on standby for a specified time "t1" and, thereafter, at Step S304, an amount of rotation R of the spool 21 is detected and, at Step S305, whether or not the amount of rotation R of the spool is within an proper range is judged. That is, the judgment is made as to whether the amount of the rotation R is a preset specified amount A1 or more and a specified amount of A2 or less (A1≦R≦A2). The processes up to now in the third embodiment are the same as for the second embodiment.

If the amount of rotation falls within the proper range, at further next Step S303, a specified amount of current (at a level that causes the electric motor 20 to rotate reliably) is applied to the electric motor 20 so that the spool 12 rotates in a direction of drawing a seat belt 1. Then, at Steps S307 to S309, the judgment is made as to whether or not the spool 21 has stopped its rotation within a predetermined specified time t2 and, if the rotation has stopped, a result from the diagnosis is judged as normal and then related processing ends and, otherwise, the result is judged as abnormal and the failure FLAG is set at Step S310 and then related processing ends.

Thus, in the third embodiment, the electric motor 20 of the retractor 10 is forcedly made to start an operation of drawing the seat belt 1 to firstly check whether an amount of rotation of the electric motor 20 (or the spool 21) per hour (or other time period) is proper or not and, if the amount of the rotation is proper, further continuously, the electric motor 20 of the retractor 10 is then made to perform the operation of retracting the seat belt 1. When the seat belt 1 is retracted up to its end, the electric motor 20 should be locked (that is, its rotation stops) and, therefore, if the locking of the electric motor 20 is confirmed after a lapse of an appropriate t2 time, the amount of the rotation is judged as normal. In cases other than this, the electric motor 20 may not operate properly and, therefore, the amount of the rotation is judged as abnormal. This means that, by checking the rotation of the spool 21, the exact failure diagnosis of the driving system including the electric motor 20 can be carried out easily and reliably. As the time t2, time is simply set which is long enough to reliably retract the seat belt 1 when the seat belt 1 drawn once at a previous stage is again retracted up to its end.

Fourth Embodiment

Figure 8:
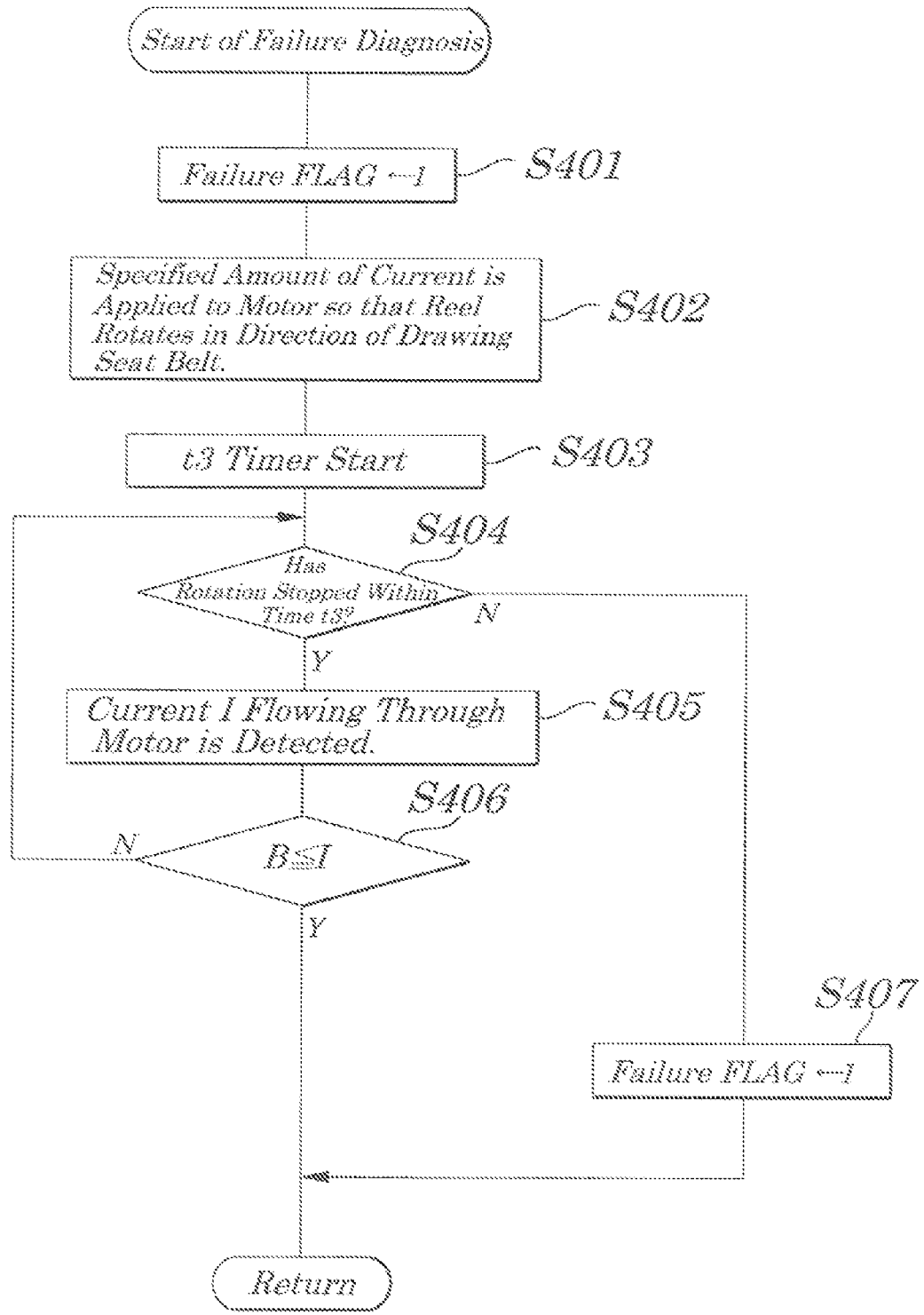
FIG. 8 is a flow chart showing contents of the failure diagnosis according to the fourth embodiment of the present invention.

FIG. 8 is a flow chart explaining a failure diagnosing routine of the fourth embodiment. In the embodiment, as a signal of the motor information detecting means 55, magnitude I of a current flowing through the electric motor 20 is used.

When the failure diagnosing routine is started, at initial Step S401, the failure FLAG is reset (to be 0) and, at next Step S402, a specified amount of driving currents (at a level that causes the electric motor 20 to rotate reliably) is applied to the electric motor 20 so that the spool 12 rotates in a direction of drawing (retracting) a seat belt 1. Then, at Steps S403 to S406, if the magnitude I of a current of the electric motor 20 to be detected by the motor information detecting means 55 reaches a preset value B or more within a predetermined specified time t3, a result from the diagnosis is judged as normal and then processing ends. In cases other than that, the result is judged as abnormal and, at Step S407, the failure FLAG is set and processing ends.

Thus, in the fourth embodiment, the electric motor 20 of the retractor 10 is forcedly made to perform an operation of retracting the seat belt 1. The electric motor 20, when having retracted the seat belt 1 up to its end, is locked and a value of a current flowing through the electric motor 20 should increase due to increased load and, therefore, if locking is confirmed by a rise of the current value within proper time t3 after the start of retraction, the result is judged as normal. In cases other than this, there is a possibility that the electric motor 20 is not operating properly and, therefore, the result is judged abnormal. Thus, by checking the magnitude I of a value of the current flowing through the electric motor 20, the exact failure diagnosis of the driving system including the electric motor 20 can be performed easily and reliably. Moreover, as the time t3, time is simply set which is long enough to reliably retract the seat belt 1 being loosened to some extent when the seat belt 1 is drawn out.

Fifth Embodiment

Figure 9:
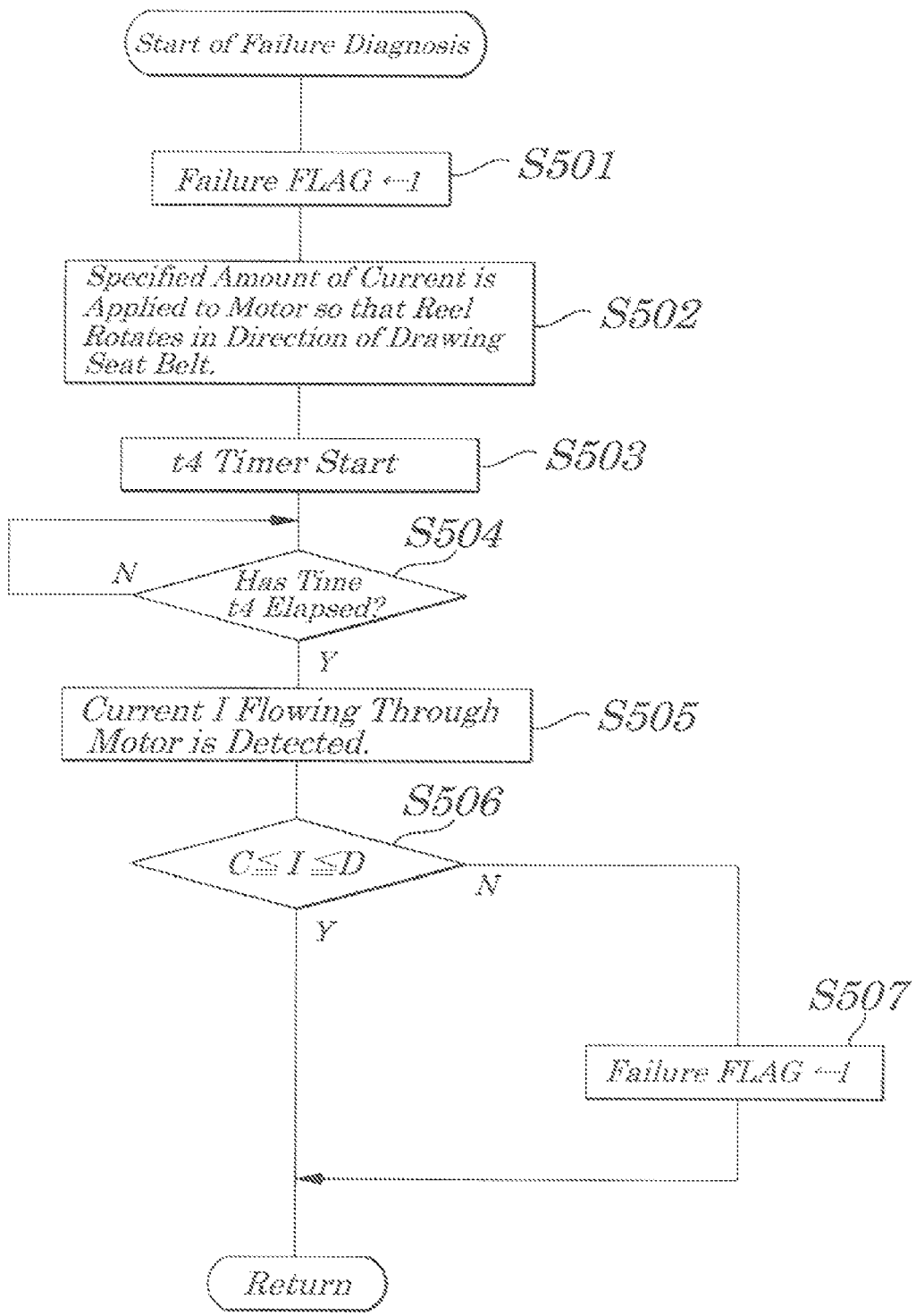
FIG. 9 is a flow chart showing contents of the failure diagnosis according to the fifth embodiment of the present invention.

FIG. 9 is a flow chart explaining a failure diagnosing routine of the fifth embodiment. In the embodiment, as a signal of the motor information detecting means 55, magnitude I of a current flowing through the electric motor 20 is used.

When the failure diagnosing routine is started, at initial Step S501, the failure FLAG is reset (to be 0) and at next Step S502, a specified amount of driving current (at a level that causes the electric motor 20 to rotate reliably) is applied to the electric motor 20 so that the spool 12 rotates in a direction of drawing out a seat belt. Then, at Steps 503 to 506, after a lapse of predetermined and specified time t4, the judgment is made as to whether the magnitude I of a current, to be detected by the motor information detecting means 55, flowing through the electric motor 20 is in a proper range. That is, the judgment is made as to whether or not the magnitude I of the current is equal to a specified value C or more and is equal to the specified value D or less (that is, C≦I≦D) and, if the magnitude I is within a proper range, the result from the failure diagnosis is judged as normal and then processing ends and, in cases other than this, judged as abnormal and, at Step S507, the failure FLAG is set and then the processing ends.

Thus, in the fifth embodiment, the electric motor 20 of the retractor 10 is forcedly made to perform an operation of retracting the seat belt 1 and, if the current flowing through the electric motor 20 is proper at that time, the rotation of the electric motor 20 is considered proper and the magnitude I is judged normal. In cases other than this, there is a possibility that the electric motor 20 is not operating properly. Therefore, by checking the magnitude I of a value of the current flowing through the electric motor 20, the exact failure diagnosis of the driving system including the electric motor 20 can be performed easily and reliably. Moreover, as the time t43, any time can be set, however, if too short, the diagnosis is affected by driving load and, if too long, the diagnosis is affected by a change in load caused by too much drawing-out of the seat belt 1. Therefore, it is desirable that time during which the spool 12 rotates only several times at time of normal operation is simply set. Moreover, as the values C and D, values by which, whether or not the magnitude I exceeds a current value at time of a normal operation can be confirmed are set simply.

Sixth Embodiment

Figure 10:
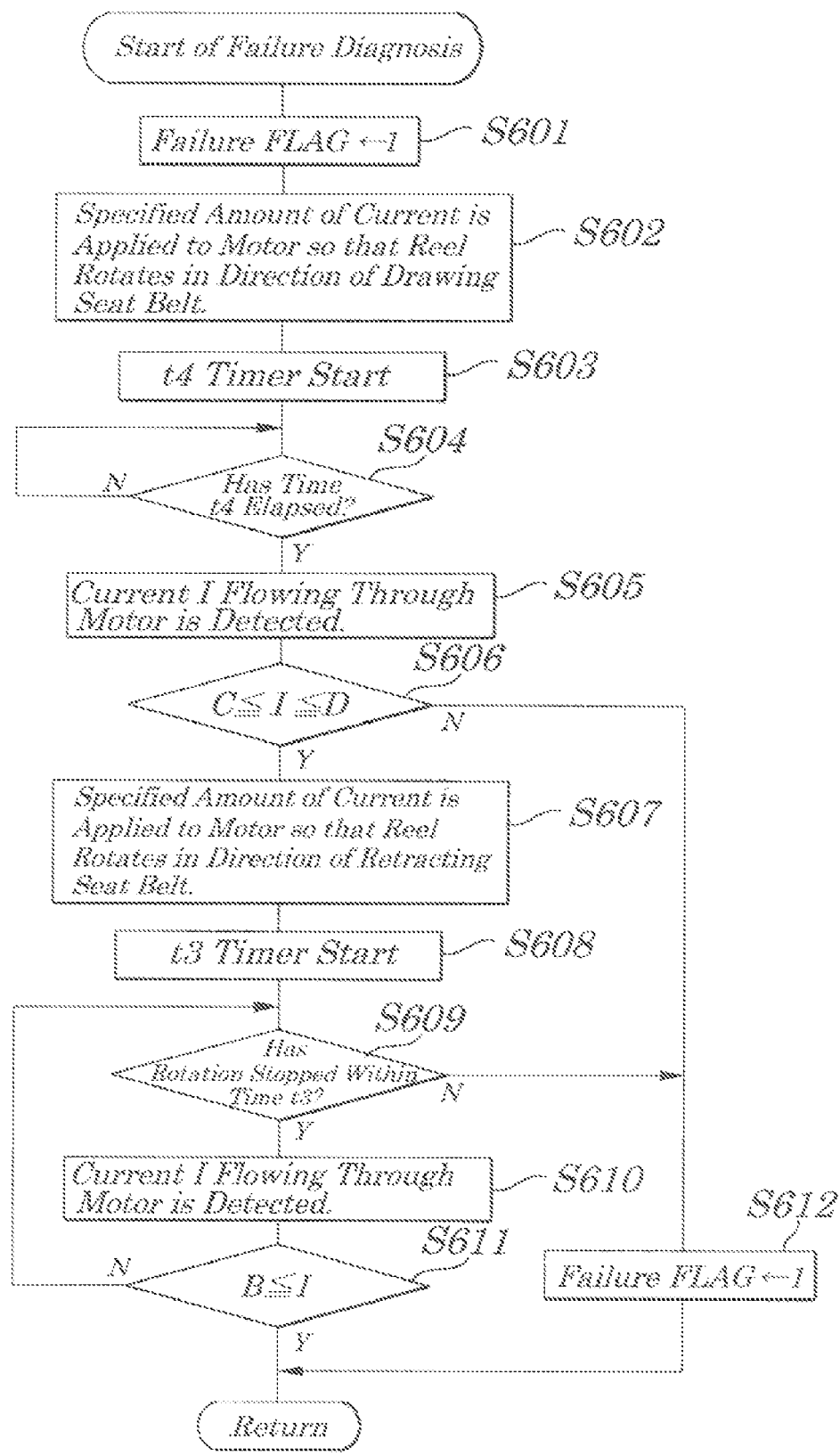
FIG. 10 is a flow chart showing contents of the failure diagnosis according to the sixth embodiment of the present invention.

FIG. 10 is a flow chart explaining a failure diagnosing routine of the sixth embodiment. In the embodiment, as a signal of the motor information detecting means 55, magnitude I of a current flowing through the electric motor 20 is used.

When the failure diagnosing routine is started, at initial Step S601, the failure FLAG is reset (to be 0) and, at next Step S502, a specified amount of driving currents (at a level that causes the electric motor 20 to rotate reliably) is applied to the electric motor 20 so that the spool 12 rotates in a direction of drawing out a seat belt 1. Then, at Steps 603 to 606, after a lapse of predetermined and specified time t4, the judgment is made as to whether the magnitude I of a current, to be detected by the motor information detecting means 55, flowing through the electric motor 20 is in a proper range. That is, the judgment is made as to whether or not the magnitude I of the current is equal to a specified value C or more and is equal to the specified value D or less (that is, $C \leq I \leq D$).

If the magnitude I of the current is within a proper range, at further next Step S607, a specified amount of driving currents (at a level that causes the electric motor 20 to rotate reliably) is applied to the electric motor 20 so that the spool 12 rotates in a direction of drawing out a seat belt 1. Then, at Steps S606 to S611, if the magnitude I of a current, to be detected by the motor information detecting means 55, of the electric motor 20 has reached a specified amount B or more within a predetermined and specified time t3, a result from the failure diagnosis is judged as normal and then processing ends and, in cases other than that, at Step S612, the failure FLAG is set and then processing ends.

Thus, in the sixth embodiment, the electric motor 20 of the retractor 10 is forcedly made to perform an operation of drawing out a seat belt 1 and, if a current flowing through the electric motor at that time is proper, further continuously the electric motor 20 is forcedly made to perform the operation of retracting the seat belt 1. When the seat belt 1 is retracted up to its end, the electric motor 20 is locked (rotation is stopped) and a value of a current flowing through the electric motor 20 should be increased by an increased load and, therefore, if locking by a rise of the current value is confirmed within a proper time t3 after the start of retraction, the result from the failure diagnosis is judged proper. In cases other than that, there is a possibility that the electric motor 20 is not operating properly and the result is judged as abnormal. Therefore, by checking the magnitude I of the current flowing through the electric motor 20, exact failure diagnosis of the driving system including the electric motor 20 can be carried out easily and reliably.

INDUSTRIAL APPLICABILITY

The embodiments of the present invention are described in detail by referring to drawings, however, particular configurations of the embodiments are not limited to the above examples but may be changed and modified without departing from the scope and spirit of the invention.

The invention claimed is:

1. A failure diagnosing method for a seat belt apparatus for a vehicle of the type having a retractor to provide retracting power to a seat belt by driving to rotate a spool of the retractor by an electric motor, the method comprising:
   a step of applying a driving current by a driving circuit to the electric motor thereby driving the spool of the retractor in a state in which an ignition switch of a vehicle is OFF and beginning with a time period when a vehicle entrance door located nearest to a seat to which the seat belt is attached is changed from its closed state to its opened state;
   a step of collecting information about operation of the electric motor in response to the application of the driving current to the motor; and
   a step of carrying out failure diagnosis of the driving system for the electric motor based on the information.

2. The failure diagnosing method of the seat belt apparatus according to claim 1, wherein the driving current is applied to the electric motor during the time period so that the spool rotates in a direction of drawing out the seat belt and, if an amount of rotation of the electric motor or the spool obtained after a lapse of specified time is in a proper range, a result of the failure diagnosis is judged as normal and, in cases other than the proper range, a result from the diagnosis is judged as abnormal.

3. The failure diagnosing method of the seat belt apparatus according to claim 2, wherein if an amount of rotation of the electric motor or the spool obtained after the lapse of specified time is in the proper range, the driving current is further continuously applied to the electric motor within the time period so that the spool rotates in a direction of retracting the seat belt and, if the electric motor or the spool stops its rotation within a specified time, a result from the diagnosis is judged as normal and, in cases other than the specified time, a result from the diagnosis is judged as abnormal.

4. The failure diagnosing method of a seat belt apparatus according to claim 1, wherein the driving current is applied to the electric motor beginning with the time period so that the spool rotates in a direction of retracting the seat belt and, if the current flowing through the electric motor reaches a specified value or more within a predetermined time, a result from the diagnosis is judged as normal and, in cases less than the specified value, a result from the diagnosis is judged as abnormal.

5. The failure diagnosing method of a seat belt apparatus according to claim 1, wherein the driving current is applied to the electric motor beginning with the time period so that the spool rotates in a direction of drawing out the seat belt and, if a current flowing through the electric motor is in a proper range after a predetermined time, a result from the diagnosis is judged as normal and, in cases outside the specified range, a result from the diagnosis is judged as abnormal.

6. The failure diagnosing method of a seat belt apparatus according to claim 1, wherein the driving current is applied to the electric motor so that the spool rotates in a direction of drawing out the seat belt and, if the current flowing through the electric motor is in a proper range after a predetermined time, the driving current is further continuously applied to the electric motor so that the spool rotates in a direction of retracting the seat belt and, if a current flowing through the electric motor reaches a specified value or more within a predetermined time, a result from the diagnosis is judged as normal and, in cases other than the specified value, a result from the diagnosis is judged as abnormal.

7. A seat belt apparatus for a vehicle having failure diagnosing functions comprising:
   a retractor with an electric motor to drive to rotate a spool for retracting a seat belt;
   a motor information detecting unit to detect information related to operation of the electric motor;
   an ignition detecting unit to detect an ON/OFF state of an ignition switch of the vehicle;
   an opening/closing detecting means to detect an opening or closing state of a vehicle entrance door located nearest to a seat to which the seat belt is attached;
   a first condition detecting unit to detect that the ignition switch is in an OFF state according to a first signal from the ignition detecting unit;
   a second condition detecting unit to detect that the vehicle entrance door is changed from its closing state to its opening state according to a second signal from the opening/closing detecting means;
   a failure diagnosis timing judging unit to start a failure diagnosis operation when the first and second signals are output from both the first condition detecting unit and the second condition detecting unit; and
   a failure diagnosing unit to apply a driving current to the electric motor thereby driving the spool of the retractor when a failure diagnosing operation is started based on a judgment of the failure diagnosis timing judging unit and to perform a failure diagnosis of a driving system for the electric motor based on an output, in response to the application of the current, from the motor information detecting unit.

8. The seat belt apparatus according to claim 7, wherein the motor information detecting unit has a function of detecting rotation of the electric motor or of the spool and wherein the failure diagnosing unit applies, when an failure diagnosis operation is started based on a judgment of the failure diagnosis timing judging unit, the driving current so that the spool rotates in a direction of drawing out the seat belt and, if an amount of rotation of the electric motor or the spool detected by the motor information detecting unit is in a proper range after a lapse of predetermined time, judges a result from the failure diagnosis as normal and judges, in cases other than the proper range, a result from the failure diagnosis as abnormal.

9. The seat belt apparatus according to claim 8, wherein if an amount of rotation of the electric motor or the spool detected by the motor information detecting unit is in the proper range after the lapse of predetermined time, further continuously applies the driving current to the electric motor so that the spool rotates in a direction of retracting the seat belt and, if the motor information detecting unit detects a stop of rotation of the electric motor or the spool within a predetermined time, judges a result from the diagnosis as normal and judges, in cases other than the predetermined time, a result from the diagnosis as abnormal.

10. The seat belt apparatus according to claim 7, wherein the motor information detecting unit has a function of detecting a magnitude of the current flowing through the electric motor and wherein the failure diagnosing unit applies, when a failure diagnosis operation is started based on a judgment of the failure diagnosis timing judging unit, a driving current to the electric motor so that the spool rotates in a direction of retracting the seat belt and, if magnitude of the current of the electric motor to be detected by the motor information detecting unit reaches a specified value or more within a predetermined time, judges a result from the diagnosis as normal and judges, in cases other than the predetermined time, a result from the diagnosis as abnormal.

11. The seat belt apparatus according to claim 7, wherein the motor information detecting unit has a function of detecting the magnitude of the current flowing through the electric motor and wherein the failure diagnosing unit applies, when a failure diagnosis operation is started based on a judgment of the failure diagnosis timing judging unit, a driving current to the electric motor so that the spool rotates in a direction of retracting the seat belt and, if magnitude of the current of the electric motor to be detected by the motor information detecting unit is in a proper range after a predetermined time, judges a result from the diagnosis as normal and judges, in cases other than the predetermined time, a result from the diagnosis as abnormal.

12. The seat belt apparatus according to claim 7, wherein the motor information detecting unit has a function of detecting magnitude of the current flowing through the electric motor and wherein the failure diagnosing unit applies, when a failure diagnosis operation is started based on a judgment of the failure diagnosis timing judging unit, a driving current to the electric motor so that the spool rotates in a direction of retracting the seat belt and, if magnitude of the current of the electric motor to be detected by the motor information detecting unit is in a proper range after a predetermined time, further continuously applies the driving current to the electric motor so that the spool rotates in a direction of retracting the seat belt and, if magnitude of the current of the electric motor to be detected by the motor information detecting unit, judges a result from the diagnosis as normal and judges, in cases other than the proper range, a result from the diagnosis as abnormal.

* * * * *